US012691724B2

(12) United States Patent
Iglizn et al.

(10) Patent No.: US 12,691,724 B2
(45) Date of Patent: Jul. 28, 2026

(54) APPARATUS COMPRISING A PHOTOVOLTAIC SYSTEM

(71) Applicant: THERMO KING LLC, Minneapolis, MN (US)

(72) Inventors: Alexander Iglizn, Erkrath (DE); Matthew Srnec, Minnetonka, MN (US); Vikram Madineni, Dusseldorf (DE)

(73) Assignee: THERMO KING LLC, Minneapolis, MN (US)

( * ) Notice: Subject to any disclaimer, the term of this patent is extended or adjusted under 35 U.S.C. 154(b) by 234 days.

(21) Appl. No.: 18/366,292

(22) Filed: Aug. 7, 2023

(65) Prior Publication Data

US 2024/0042824 A1     Feb. 8, 2024

(30) Foreign Application Priority Data

Aug. 8, 2022     (EP) ..................................... 22189282

(51) Int. Cl.
| | |
|---|---|
| *H02S 40/30* | (2014.01) |
| *B60H 1/00* | (2006.01) |
| *B60L 53/51* | (2019.01) |
| *H02J 7/35* | (2006.01) |
| *H02J 7/60* | (2026.01) |
| *H02J 101/24* | (2026.01) |

(52) U.S. Cl.
CPC .......... *B60H 1/00428* (2013.01); *B60L 53/51* (2019.02); *H02S 40/30* (2014.12); *B60L 2210/14* (2013.01); *H02J 7/35* (2013.01); *H02J 7/663* (2026.01); *H02J 2101/24* (2026.01)

(58) Field of Classification Search
CPC .................................................. H02S 40/30–38
USPC .................................................. 136/243–265
See application file for complete search history.

(56) References Cited

U.S. PATENT DOCUMENTS

| | | | |
|---|---|---|---|
| 2008/0143188 A1* | 6/2008 | Adest ...................... | H02M 7/42 |
| | | | 307/82 |
| 2014/0211520 A1* | 7/2014 | Zhang ................... | H02M 1/126 |
| | | | 363/37 |
| 2020/0114846 A1* | 4/2020 | Ildiz ...................... | B60R 16/033 |
| 2020/0232686 A1 | 7/2020 | Arnedo et al. | |

(Continued)

FOREIGN PATENT DOCUMENTS

| | | |
|---|---|---|
| EP | 3419154 | 12/2018 |
| EP | 3790146 | 3/2021 |

OTHER PUBLICATIONS

Extended European Search Report, issued in the corresponding European patent application No. 22189282.1, dated Jan. 31, 2023, 8 pages.

*Primary Examiner* — Bach T Dinh
(74) *Attorney, Agent, or Firm* — HSML P.C.

(57) ABSTRACT

The present disclosure relates to an apparatus configured to supply electrical power to a transport refrigeration unit, the apparatus comprising a power converter and a photovoltaic system including a photovoltaic cell. The power converter includes a rectifier, an inverter and a DC bus internal to the power converter. The DC bus is electrically connected to an output of the rectifier and an input of the inverter, an input of the rectifier is electrically couplable to a power source external to the apparatus at a connection port, and an output of the inverter is electrically couplable to the transport refrigeration unit.

7 Claims, 5 Drawing Sheets

(56)          References Cited

U.S. PATENT DOCUMENTS

| 2021/0070139 A1 | 3/2021 | Schumacher et al. | |
|---|---|---|---|
| 2021/0252947 A1* | 8/2021 | She | H02J 7/1415 |
| 2023/0174008 A1* | 6/2023 | Lowe | B60H 1/3232 |
| | | | 62/236 |

* cited by examiner

APPARATUS COMPRISING A PHOTOVOLTAIC SYSTEM

FIELD OF THE INVENTION

The present disclosure relates to an apparatus configured to supply electrical power to a transportation refrigeration unit, the apparatus comprising a power converter and a photovoltaic system. The present disclosure also relates to an apparatus comprising a power converter, a photovoltaic system and a power distribution unit.

BACKGROUND OF THE INVENTION

It is known for a transport refrigeration unit (TRU) to comprise at least one component which requires a supply of alternating current electrical power for operation. When a TRU is not in transit, it may be that the TRU receives at least part of the required supply of alternating current electrical power for operation from an external AC power source such as a public or a private electrical grid (sometimes referred to as "shore power"). Otherwise, when the TRU is in transit, it may be that the TRU receives at least part of the required supply of alternating current electrical power for operation from an internal AC power source such as an electrical generator, or it may be that the at least part of the required supply of alternating current electrical power is supplied by an internal DC power source such as a battery, via a suitable DC-AC conversion system.

It may be that a set of characteristics of the alternating current electrical power supplied by the external AC power source render the alternating current electrical power supplied by the external AC power source unsuitable or suboptimal for supplying directly to the TRU. For example, it may be that alternating current electrical power supplied to the TRU should preferably have a frequency and/or a root mean square voltage which differs from the frequency and/or the root mean square voltage of the alternating current electrical power supplied by the external AC power source. A power converter may be provided for the purpose of converting the alternating current electrical power supplied by the external AC power source into a suitable alternating current electrical power for subsequent delivery to the TRU.

Increasingly, it is considered advantageous to provide a diverse range of internal power sources to supply electrical power for operation of a TRU. It is therefore desirable to provide an improved apparatus for supplying electrical power to a TRU.

SUMMARY OF THE INVENTION

According to a first aspect, there is provided an apparatus configured to supply electrical power to a transport refrigeration unit, the apparatus comprising: a power converter including a rectifier, an inverter and a DC bus internal to the power converter electrically connected to an output of the rectifier and an input of the inverter, an input of the rectifier being electrically couplable to an power source external to the apparatus at a connection port and an output of the inverter being electrically couplable to the transport refrigeration unit; and a photovoltaic system including a photovoltaic cell, wherein an output of the photovoltaic system is electrically coupled to the DC bus of the power converter. The apparatus may comprise the transport refrigeration unit.

The apparatus may further comprise a first DC-DC converter electrically connected between the output of the photovoltaic system and the DC bus of the power converter, and the first DC-DC converter may be configured to convert the output voltage of the photovoltaic system from the target voltage magnitude to a first voltage magnitude, the first voltage magnitude corresponding to an operating voltage of the DC bus. The first voltage magnitude may always be higher than the target voltage magnitude. In addition, the output voltage of the photovoltaic system may be equal to or less than 60 VDC.

Alternatively, it may be that the photovoltaic system is provided with a voltage regulator arrangement configured to regulate an output voltage of the photovoltaic system at a target voltage magnitude. The target voltage magnitude may be selected to correspond to an operating voltage of the DC bus and the output of the photovoltaic system may be directly connected to the DC bus.

The apparatus may further comprise a power distribution unit, wherein the power distribution unit is electrically coupled to the DC bus of the power converter. The apparatus may also comprise a battery electrically coupled to the power distribution unit. In addition, the apparatus may further comprise a second DC-DC converter coupled between the DC bus of the power converter and the power distribution unit, wherein the second DC-DC converter is configured to: convert a voltage supplied to the second DC-DC converter by the power distribution unit from a second voltage magnitude to a first voltage magnitude for supply to the DC bus, the first voltage magnitude corresponding to an operating voltage of the DC bus and the second voltage magnitude corresponding to an operating voltage of the power distribution unit; and convert a voltage supplied to the second DC-DC converter the DC bus to the power distribution unit from the first voltage magnitude to a second voltage magnitude for supply to the power distribution unit.

The first voltage magnitude may be greater than the second voltage magnitude. The second voltage magnitude may correspond to a voltage of the battery. It may be that the power converter comprises the first DC-DC converter and/or the second DC-DC converter if present.

According to a second aspect, there is provided an apparatus configured to supply electrical power to a transport refrigeration comprising: a power converter including a rectifier, an inverter and a DC bus internal to the power converter electrically connected to an output of the rectifier and an input of the inverter, an input of the rectifier being electrically connectable to a power source external to the apparatus at a connection port and an output of the inverter being electrically couplable to the transport refrigeration unit; a power distribution unit electrically coupled to the DC bus of the power converter; and a photovoltaic system including a photovoltaic cell and provided with a voltage regulator arrangement configured to regulate an output voltage of the photovoltaic system at a target voltage magnitude, wherein an output of the photovoltaic system is electrically coupled to the power distribution unit. The apparatus may comprise the transport refrigeration unit.

Additionally, the apparatus may further comprise a DC-DC converter connected between the DC bus of the power converter and the power distribution unit, wherein the DC-DC converter is configured to: convert a voltage supplied to the DC-DC converter by the power distribution unit from a second voltage magnitude to a first voltage magnitude for supply to the DC bus, the first voltage magnitude corresponding to an operating voltage of the DC bus and the second voltage magnitude corresponding to an operating voltage of the power distribution unit; and convert a voltage supplied to the DC-DC converter by the power distribution unit from the first voltage magnitude to the second voltage magnitude for supply to the power distribution unit. The first voltage magnitude may be greater than the second voltage magnitude. It may be that the power converter comprises the DC-DC converter, if present.

It may be that the apparatus further comprises a battery electrically connected to the power distribution unit, and wherein the target voltage magnitude is selected to correspond to a voltage of the battery. The second voltage magnitude may correspond to the voltage of the battery.

According to the first aspect or the second aspect, it may be that the output of the inverter is electrically couplable to the transport refrigeration unit via an output sine-wave filter, and/or it may be that the input of the rectifier is electrically couplable to the external power source via an input filter. It may be that the power converter comprises the input filter and/or the output sine-wave filter if present.

In accordance with the first aspect or the second aspect, it may be that the photovoltaic system comprises a plurality of photovoltaic strings, each photovoltaic string comprising at least one photovoltaic cell. The plurality of photovoltaic strings may be arranged in parallel, and each photovoltaic string may further comprise an isolation contactor or switch configured to isolate the respective photovoltaic string. Otherwise, the plurality of photovoltaic strings may be arranged in series, and each photovoltaic string may further comprise an isolation contactor or switch configured to isolate and bypass the respective photovoltaic string. It may be that at least one of, but preferably each of, the plurality of photovoltaic strings comprises a plurality of photovoltaic cells connected in series.

According to the first aspect or the second aspect, it may be that the apparatus further comprises an electrical generator, and wherein the input of the rectifier is also electrically coupled to the electrical generator, and optionally wherein the electrical generator comprises an internal combustion engine, a gas turbine engine and/or a kinetic energy recovery system.

DETAILED DESCRIPTION

The disclosure generally relates to an apparatus configured to supply electrical power to a transport refrigeration unit (TRU). More specifically, the disclosure relates to a mobile climate-controlled module having a TRU, an apparatus configured to supply electrical power to the TRU and a climate-controlled compartment. Exemplary mobile climate-controlled modules include an over-the-road trailer, an over-the road truck body, a bus, a transport container and a railway car. The climate-controlled compartment can take the form of multiple compartments or have multiple zones.

Figure 1:
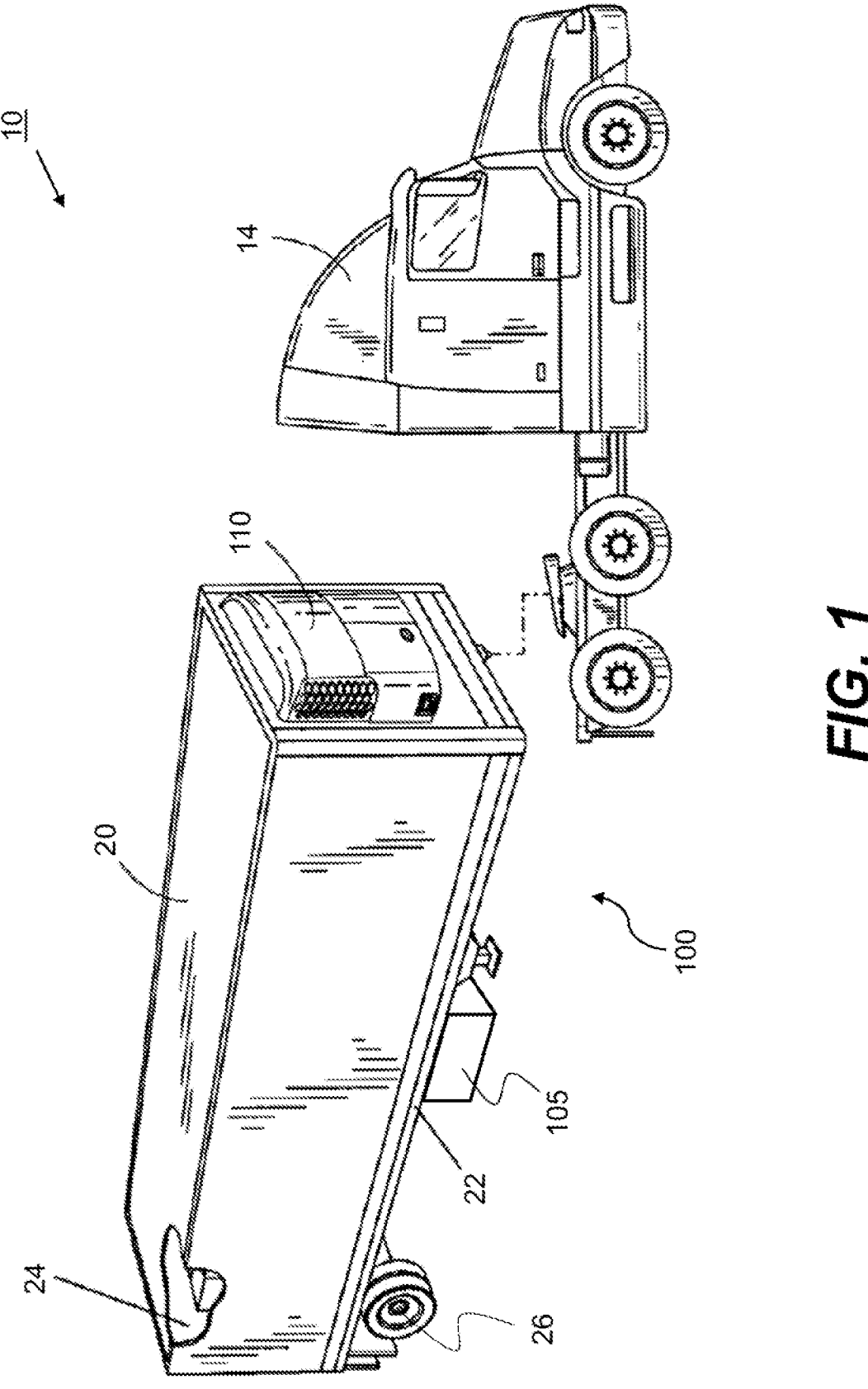
FIG. 1 shows a vehicle comprising a climate-controlled module.

FIG. 1 shows a vehicle 10 comprising a climate-controlled module 20. In the example of FIG. 1, the climate-controlled module 20 is an over-the-road refrigerated semi-trailer 20 having a structure 22 supporting (or forming) a single climate-controlled compartment 24 which is configured to be cooled and/or heated by a TRU 110. The structure 22 includes a chassis. The vehicle 10 comprises an apparatus 100 which includes various components disposed within an under-chassis box 105. In some examples, one or more components of the apparatus 100 may be integrated or incorporated into the TRU 110. The structure 22 also supports the TRU 110 and the under-chassis box 105. The vehicle 10 further comprises a tractor unit 14 removably couplable to the trailer 20.

Figure 2A:
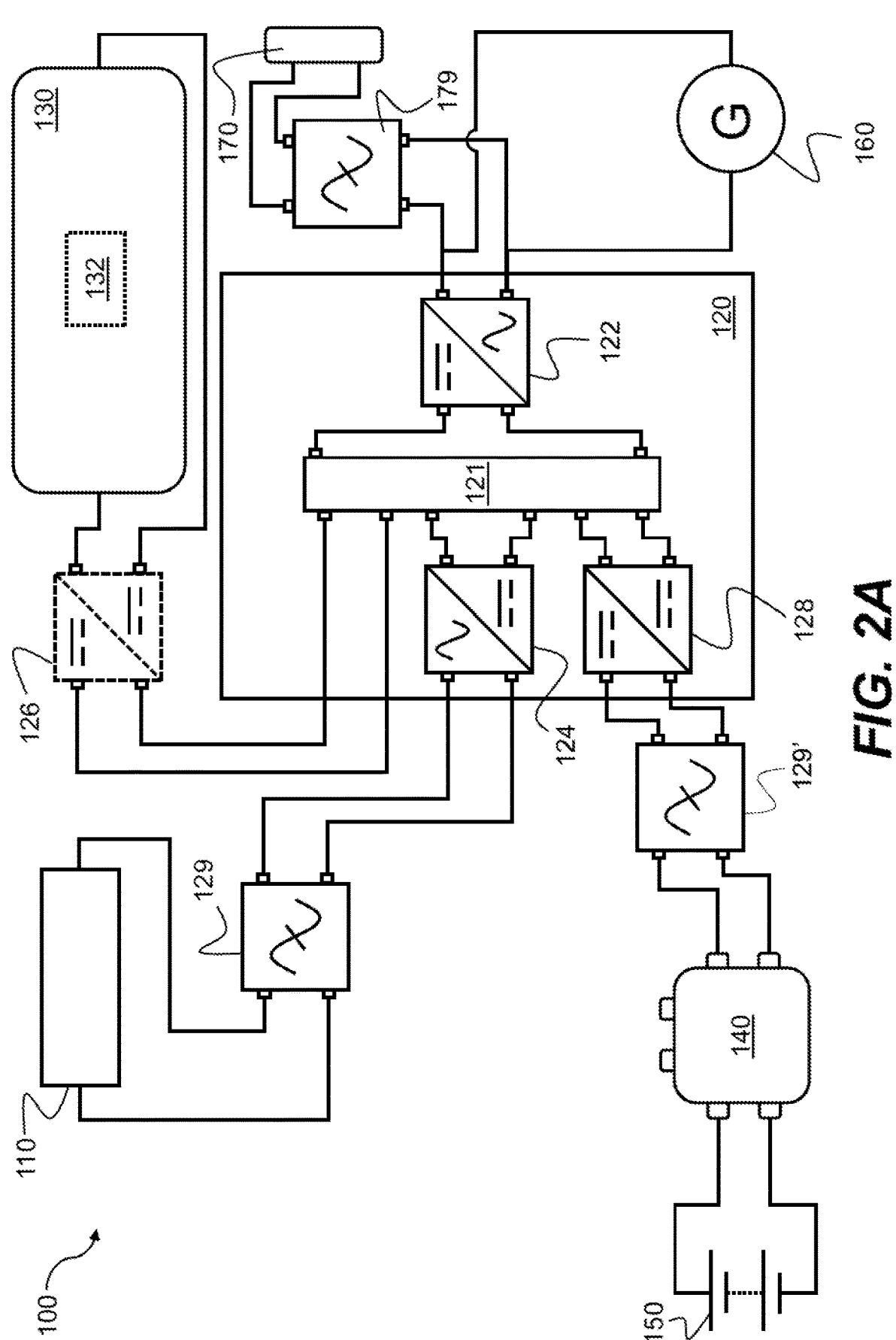
FIG. 2A shows a first example apparatus comprising a photovoltaic system.
Figure 2B:
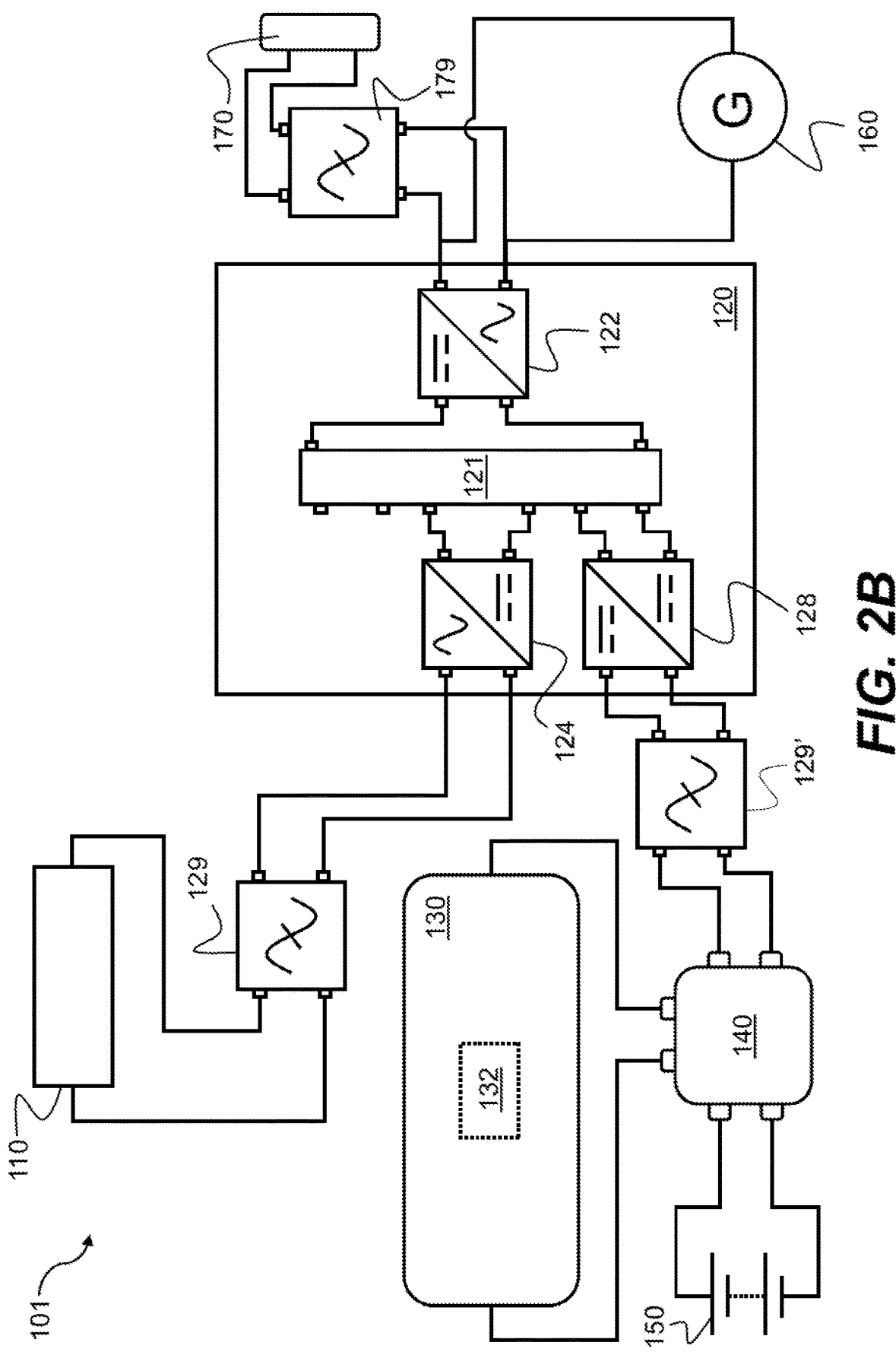
FIG. 2B shows a second example apparatus comprising a photovoltaic system.

FIG. 2A shows a first example apparatus 100 configured to supply electrical power to a transport refrigeration unit (TRU) 110, the first example apparatus 100 comprising a power converter 120 and a photovoltaic system 130. The apparatus 100 may be configured to supply monophase or polyphase (e.g. three phase) electrical power to the TRU 110. The photovoltaic system 130 includes at least one photovoltaic cell, as described in further detail below with reference to FIGS. 3A and 3B. FIG. 2B shows a second example apparatus 101. The second example apparatus 101 is generally similar to the first example apparatus 100, with like reference signs indicating common or similar features. In some embodiments of the disclosure, the apparatus 100, 101 may comprise the TRU 110, but it is to be understood that the apparatus 100 need not include the TRU 110. The similarities and the differences between the first example apparatus 100 and the second example apparatus 101 are explained in detail below.

With respect to both the first example apparatus 100 and the second example apparatus 101, the TRU 110 may comprise at least one temperature control component which requires a supply of electrical power for operation. In particular, the TRU 110 may comprise a refrigeration circuit, at least one fan, at least one pump and/or at least one gas exchange module. The refrigeration circuit includes at least one compressor, at least one condenser and at least one evaporator and at least one expansion device. At least one component of the TRU 110 requires a supply of an alternating current (AC) electrical power for operation, and the TRU 110 may generally be considered to comprise any suitable combination of a resistive load, an inductive load and/or a capacitive load. Consequently, the TRU 110 may be considered to be a power sink having an associated power demand. The apparatus 100, 101 may be incorporated within a mobile climate-controlled module including a climate-controlled compartment, such as the climate-controlled module 20 and the climate-controlled compartment 24 shown in FIG. 1. Accordingly, the apparatus 100, 101 is generally configured for use in transit.

The power converter 120 includes a DC bus 121 internal to the power converter 120, a rectifier 122 and an inverter 124. An output of the rectifier 122 is electrically connected to the DC bus 121 and an input of the inverter 124 is also electrically connected to the DC bus 121. The rectifier 122 may be described as an internal AC-DC stage of the power converter 120, whereas the inverter 124 may be described as an internal DC-AC stage of the power converter 120.

An input of the rectifier 122 is electrically couplable to an AC power source external to the apparatus 100, 101 at a connection port 170 of the apparatus 100, 101. A power source is external to the apparatus 100, 101 in the sense that any electrical energy storage capacity or electrical energy generation capacity of the power source is not disposed within the apparatus 100, 101 or within a module/vehicle in which the apparatus 100, 101 is incorporated. Generally, the external AC power source may be connected at the connection port 170 when the apparatus 100, 101 is stationary (that is, not in transit), whereas the external AC power source is not connected at the connection port 170 when the apparatus 100, 101 is in transit (that is, not stationary). The external AC power source may be, as a particular example, an electrical grid such as a public or private electrical grid, or an AC charging point of the kind used to charge electric vehicles.

An output of the inverter 124 is electrically couplable to the TRU 110. The rectifier 122 and/or the inverter 124 may comprise one or more power switching components. Each power switching component may include, for example, an insulated gate bipolar transistor (IGBT), a junction-gate field-effect transistor (JFET), a thyristor, and/or a power metal-oxide-semiconductor field-effect transistor (MOS-FET). In particular, each power switching component may include a gate turn-off thyristor (GTO) and/or an integrated gate-commutated thyristor (ICGT).

In use, the rectifier 122 receives an AC electrical power input supplied to its input (e.g. from the external AC power source) and converts it into a DC power output which is then supplied to the DC bus 121 via the output of the rectifier 122. Conversely, the inverter 124 receives a DC electrical power input supplied to its input by the DC bus 121 and converts it into an AC power output, suitable for supplying the TRU 110. It may be that at least one component of the TRU 110 requires a supply of direct current (DC) electrical power for operation. To this end, the TRU 110 may comprise a local converter system (not shown) for the purpose of converting AC electrical power supplied by first inverter 124 into DC electrical power.

The DC bus 121 of the power converter 120 has a nominal or rated operating voltage (or operating voltage range). The nominal or rated operating voltage of the DC bus 121 may be determined based on a set of requirements for the AC electrical power which is to be provided to the TRU 110 in use across a range of operating conditions under which the TRU 110 is typically required to operate in use. Specifically, the operating voltage may be determined based on a maximum voltage of the AC electrical power to be provided to the TRU 110 in use across the expected range of operating conditions of the TRU 110 such that the inverter 124 is able to easily provide an AC power output which meets a required voltage for the AC electrical power to be provided to the TRU across a broad range of operating conditions of the apparatus 100, 101.

The photovoltaic system 130 is configured to supply an output voltage to the apparatus 100, 101 such that the photovoltaic system 130 functions as an internal DC power source in use. A power source may be internal to the apparatus 100, 101 in the sense that any electrical energy storage capacity or electrical energy generation capacity of the power source is disposed within the apparatus 100, 101 or within a module/vehicle in which the apparatus 100, 101 is incorporated.

The photovoltaic system 130 may be provided with a voltage regulator arrangement 132 configured to regulate the output voltage of the photovoltaic system 130 at a target voltage magnitude. The voltage regulator arrangement 132 may include and be referred to as a DC-DC optimiser 132. Further, the voltage regulator arrangement 132 may include buck voltage conversion and/or boost voltage conversion functionality, such that the voltage regulator arrangement may be considered to include a boost DC-DC converter, a buck DC-DC converter and/or a buck-boost DC-DC converter. Those skilled in the art will be familiar with suitable voltage regulator circuitry for the voltage regulator arrangement 132. As explained in further detail below, the target voltage may be selected to ensure that the output voltage of the photovoltaic system 130 may be readily provided to another component of the apparatus 100, 101 for subsequent utilisation of electrical energy provided by the photovoltaic system 130.

The electrical energy provided by the photovoltaic system 130 may be immediately used to power the TRU 110 or the electrical energy provided by the photovoltaic system 130 may be stored within an electrical energy storage device of the apparatus 100, 101, if present, for subsequent use to power the transport refrigeration unit 110. In summary, the voltage regulator arrangement 132 enables the output voltage of the photovoltaic system 130 to be readily utilised within the apparatus 100, 101.

As shown in the examples of FIGS. 2A and 2B, the output of the inverter 124 may be electrically couplable to the TRU 110 via an output sine-wave filter 129. The output sine-wave filter 129 is generally configured to increase a degree to which a time-domain profile of an AC electrical power supplied to the TRU 110 in use conforms to a substantially sinusoidal profile. To this end, it may be that the output sine-wave filter 129 comprises a low-pass filter configured to attenuate high frequency components (i.e. components above an upper threshold frequency) of the AC electrical power that is supplied to the TRU 110 in use, such that the time-domain profile of the AC electrical power supplied to the TRU is primarily composed of frequency components below the upper-frequency threshold, which in turn results in an increase in the degree to which the time-domain profile of an AC electrical power supplied to the TRU 110 conforms to a substantially sinusoidal profile. In addition to the low-pass filter, the output sine-wave filter 129 may comprise a high-pass filter configured to attenuate any low frequency components (i.e. components below a lower frequency threshold) of the AC electrical power that is supplied to the TRU 110 in use, such that the time-domain profile of the AC electrical power supplied to the TRU is primarily composed of frequency components between the lower-frequency threshold and the upper-frequency threshold. This may further increase the degree to which the time-domain profile of an AC electrical power supplied to the TRU 110 conforms to a substantially sinusoidal profile. As will be appreciated by those of ordinary skill in the art, equivalent functionality can be achieved through the use of a band pass filter configured with a suitable pass band as the output sine-wave filter 129. To perform these functions, the output sine-wave filter 129 comprises at least one passive reactive electrical component such as an inductor or a capacitor.

It may be that for optimal operation, the TRU 110 should receive a supply of an AC electrical power having a substantially sinusoidal time-domain profile. However, it may be that a time-domain profile of an AC electrical power provided by the output of the inverter is substantially non-sinusoidal. For instance, the time-domain profile of the AC electrical power provided by the output of the inverter 124 may substantially conform to a rectangular or square wave, or another non-sinusoidal wave. Electrical coupling of the output of the inverter 124 to the TRU 110 via the output sine-wave filter 129 increases the conformity of the time-domain profile of the AC electrical power provided to the TRU 110 to a substantially sinusoidal profile, and therefore enables more effective operation of the TRU 110.

As also shown in the example of FIGS. 2A and 2B, the input of the rectifier 122 may be electrically couplable to the external AC power source at the connection port 170 via an input filter 179, which may be referred to as a grid filter 179. The input filter 179 is generally configured to remove noise from an AC electrical power supplied to the power converter 120 in use. For this purpose, the input filter 179 may comprise at least one filter as described above with respect to the output sine-wave filter 129. It may be that the operation of the rectifier 122 is improved when the supply of AC electrical power does not contain a significant amount of noise. The input filter 179 may therefore enable more effective operation of the rectifier 122 and the power converter 120 as a whole.

In some examples, the output sine-wave filter 129 and/or the input filter 179, if present, is/are disposed within the housing of the power converter 120, such that the power converter 120 comprises the output sine-wave filter 129 and/or the input filter 179.

However, it will also be appreciated that in other examples, the output of the inverter 124 is not electrically couplable to the TRU 110 via the output sine-wave filter 129 and/or the input of the rectifier 122 is not electrically couplable to the external AC power source via the input filter 179.

As shown in the examples of FIGS. 2A and 2B, the apparatus 100, 101 may comprise a power distribution unit (PDU) 140 electrically coupled to the DC bus 121 of the power converter 120. The PDU 140 is generally configured to act as an interface between the DC bus 121 of the power converter 120 and a variety of other electrical components of the apparatus 100, 101 which may be electrically coupled to the PDU 140 as described in further detail below. The PDU 140 may comprise at least one thermal fuse, such that the PDU is able to rapidly disconnect or decouple the DC bus 121 from any components of the apparatus 100, 101 which are electrically coupled to the PDU 140 if a fault current develops within the apparatus 100, 101.

The PDU 140 has a nominal or rated operating voltage. Therefore, any DC electrical voltages which are supplied to the PDU 140 from any electrical components of the apparatus 100, 101 which are electrically coupled to the PDU 140 (including the DC bus 121 of the power converter 120) should match the operating voltage of the PDU. Likewise, any DC electrical voltages which are provided to the PDU 140 from any electrical components of the apparatus 100, 101 which are electrically coupled to the PDU 140 (including the DC bus 121 of the power converter 120) should match the operating voltage of the PDU. The operating voltage of the PDU 140 may be determined according to a voltage of an electrical component of the apparatus 100, 101 which is electrically coupled to the PDU 140.

Further, it may be that the apparatus 100, 101 includes an electrical energy storage device 150 (in particular, a battery 150) which is electrically connected to the PDU 140. Accordingly, the PDU 140 is able to isolate the DC bus 121 of the power converter 120 from the battery 150 by decoupling the battery 150 from the power converter 120, to protect the battery 150 from electrical faults originating in another part of the apparatus 100, 101 and vice versa. In such examples, the operating voltage of the PDU 140 corresponds to a voltage of the battery 150. The battery 150 may have a nominal voltage or a rated voltage, but in use the operational voltage of the battery 150 varies according to a state-of-charge (SOC) of the battery 150. If the operating voltage of the PDU 140 is within an acceptable range of the voltage of the battery 150, the battery 150 may be charged (from the photovoltaic system 130 and/or the DC bus 121) and/or discharged (into the DC bus 121) via the PDU 140. In use, the battery 150 may function as either a internal DC power source or an internal DC power sink, depending on whether it is being discharged or charged, respectively.

Additionally, the apparatus 100, 101 may comprise a DC-DC converter 128 coupled between the DC bus 121 of the power converter 120 and the PDU 140 and generally operative to convert a DC voltage at a second magnitude supplied to the DC-DC converter 128 by the PDU 140 to a DC voltage at a first magnitude for supply to the DC bus 121 of the power converter 120, and to convert a DC voltage at the first magnitude supplied to the DC-DC converter 128 by the DC bus 121 of the power converter to a DC voltage at the second magnitude for supply to the PDU 140. To this end, the DC-DC converter 128 includes at least one power switching component (i.e. at least one active electrical component) and at least one passive energy storage (reactive) component, as will be appreciated by those skilled in the art. As shown in the example of FIGS. 2A and 2B, the DC-DC converter 128 may be disposed within the housing of the power converter 120 such that the power converter 120 comprises the DC-DC converter 128, in which case the DC-DC converter may referred to as an internal DC-DC stage of the power converter 120. However, this disclosure also anticipates the DC-DC converter 128 being disposed outside of the housing of the power converter 120 as an external component separate from the power converter 120.

In the examples of FIGS. 2A and 2B, the DC-DC converter 128 is shown as being coupled between the DC bus 121 and the PDU 140 via a passive filter 129'. The passive filter 129' includes at least one reactive component (i.e. at least one passive reactive electrical component, such as an inductor or a capacitor). The at least one passive electrical component of the passive filter 129' and the at least one active electrical component of the DC-DC converter cooperate to supply a smooth DC voltage to the DC bus 121 or to the PDU 140. In some examples, the output sine-wave filter 129 and the passive filter 129' are both disposed in a common housing to form a combined filter unit. In other examples, it may be that the DC-DC converter 128 includes the passive electrical components of the filter 129' such that the DC-DC converter 128 effectively comprises the passive filter 129'. In both of these examples, a complexity and an installation size of the apparatus 100, 101 may be reduced. In a further example, the power converter 120 may include one or more power switching components which, in combination with the passive reactive electrical component(s) of the passive filter 129', can be configured to perform a DC-DC conversion function, thereby avoiding the need for a dedicated DC-DC converter within the apparatus 100, 101.

The DC-DC converter 128 may also comprise at least one galvanic isolation device, such that the DC-DC converter 128 is able to selectively isolate the PDU 140 from the DC bus 121, for example in response to the development of a fault current between the PDU 140 and the DC bus 121 for improved safety of the apparatus 100. The DC-DC converter 128 allows the operating voltages of the DC bus 121 and the PDU 140, respectively, to be dissimilar. Specifically, the inclusion of the DC-DC converter 128 allows the operating voltage of the DC bus 121 to be significantly greater than the operating voltage of the PDU 140 and also allows the operating voltage of the PDU 140 to freely vary as the voltage of the battery 150 varies without having any adverse effects on effective operation of the apparatus 100, 101.

Depending on whether the battery 150 is being charged or discharged, the DC-DC converter 128 performs different functions. When the battery 150 is being charged, the DC-DC converter 128 converts the voltage supplied from the DC bus 121 at the operating voltage of the DC bus 121 (that is, a voltage having the first voltage magnitude) to a voltage for supply to the PDU 140 at the operating voltage of the PDU 140 (that is, a voltage having the second voltage magnitude, the first voltage magnitude being greater than the second voltage magnitude). Otherwise, when the battery 150 is being discharged, the DC-DC converter 128 converts the voltage supplied from the PDU 140 at the operating voltage of the PDU 140 (that is, a voltage having the second voltage magnitude) to a voltage for supply to the DC bus 121 at the operating voltage of the DC bus 121 (that is, a voltage having the first voltage magnitude). Accordingly, the DC-DC converter 128 may be considered to be a buck-boost DC-DC converter. The DC-DC converter 128 may comprise a variety of electrical components required in order to function as a buck-boost DC-DC converter, as will be apparent to those skilled in the art.

The first voltage magnitude is the magnitude of the operating voltage of the DC bus 121. In order to ensure that the inverter 124 of the power converter 120 is able easily to provide an AC power output which meets the required voltage for the AC electrical power to be provided to the TRU 110 across a broad range of operating conditions, the operating voltage of the DC bus 121 (and therefore the first voltage magnitude) may be selected so as to be in a range between 600 VDC and 800 VDC. Preferably, the operating voltage of the DC bus 121 may be approximately 700 VDC. The second voltage magnitude is the magnitude of the operating voltage of the PDU 140, which in turn corresponds to the output/terminal voltage of the battery 150. Depending on the SOC of the battery 150, the second voltage magnitude may typically vary within a range between 300 VDC and 400 VDC.

The apparatus 100, 101 may comprise an electrical generator 160 which generally functions as an internal AC power source in use. The electrical generator 160 may be a monophase or a polyphase (e.g. three phase) electrical generator. The electrical generator 160 may comprise a prime mover such as a heat engine (e.g. an internal combustion engine or a gas turbine engine) or a kinetic energy recovery system such as an axle-mounted generator. In such examples, the input of the rectifier 122 is also electrically coupled to the electrical generator 160 in addition to the connection port 170. The coupling of the electrical generator 160 to the input of the rectifier 122 provides simple means for incorporating an internal AC power source within the apparatus 100, 101 without unduly increasing the complexity of the apparatus 100, 101.

As described above, the TRU 110 functions as an internal DC power sink in use. It follows that, when the TRU 110 is in operation, sufficient electrical power must be supplied to the TRU 110 from a suitable combination of internal DC power sources (e.g. the photovoltaic system 130 and/or the battery 150 when being discharged), internal AC power sources (e.g. the electrical generator 160) and/or external AC power sources (e.g. as connected at the connection port 170) as available and applicable to meet the power demand of the TRU 110.

Under some operating conditions, it may be that a total power availability from the photovoltaic system 130, the electrical generator 160 (if present) and the external AC power source (if connected at the connection port 170) is equal to the power demand of the TRU 110. For example, it may be that the photovoltaic system 130 (or the photovoltaic system 140 in combination with the electrical generator 160, if present and of the external AC power source, if connected) is able to provide sufficient electrical power to meet the power demand of the TRU 110 without a need to discharge the battery 150. In such an example, the apparatus 100, 101 enables electrical power to be supplied from the photovoltaic system (and, if applicable, the electrical generator 160 and/or the external AC power source) without a need for any electrical power to be passed through the battery 150. In other words, the battery 150 need not be directly charged by the photovoltaic system 130 (and, if applicable, the electrical generator 160 and/or the external AC power source) in order for power to be supplied from these power sources to the TRU 110. This reduces a number of charging and discharging cycles applied to the battery 150 over time, which reduces a cyclic degradation of the battery 150, thereby increasing a mean time between failures of the battery 150 and therefore extending an expected service life of the apparatus 100, 101.

Under other operating conditions, it may be that the total power availability from the photovoltaic system 130, the electrical generator 160 (if present) and the external AC power source (if connected at the connection port 170) is lower than the power demand of the TRU 110. If so, the battery 150 may be discharged so as to function as an internal DC power source and thereby provide additional power necessary to meet the power demand of the TRU 110. Under alternative operating conditions, it may be that the total power availability from the photovoltaic system 130, the electrical generator 160 (if present) and the external AC power source (if connected at the connection port 170) is greater than the power demand of the TRU 110. If so, the battery 150 may be charged so as to function as an internal DC power sink and thereby store additional power which is not necessary to meet the power demand of the TRU 110 for future utilisation.

In summary, the apparatus 100, 101 provides a flexible arrangement in which multiple power sources and or power sinks may be coupled or connected to a TRU 110 so as to meet the power demand of the TRU 110 in use. In addition, the apparatus 100, 101 enables the use of an electrical energy storage device 150 (i.e. the battery 150) having a relatively high nominal voltage, such as in a range of 300 VDC and 400 VDC as described above, to be readily utilised alongside the photovoltaic system 130. That is to say that the configuration of the apparatus 100, 101 permits the safe and easy use of a high-voltage battery 150. Use of a high-voltage battery 150 is associated with reduced currents within the apparatus 100, 101 in use, which in turn is associated with reduced resistive heating losses and therefore an increased efficiency of the apparatus 100, 101 in use. Further, the apparatus 100, 101 allows the photovoltaic system 130 to be configured in such a way that the output voltage thereof is relatively low, which is associated with an improved safety of the apparatus 100, 101, especially because the photovoltaic system 130 will typically be mounted on an external surface (e.g. an exposed surface of, for instance, the trailer 20 of FIG. 1) of a climate-controlled module in which it is incorporated. In particular, if the output voltage of the photovoltaic system 130 is equal to or less than 60 VDC, the safety of the apparatus 100, 101 may be greatly improved.

Now turning to the first example apparatus 100 in particular (as shown in FIG. 2A), an output of the photovoltaic system 130 is electrically coupled to the DC bus 121 of the power converter 120.

In the first example apparatus 100, the voltage regulator arrangement 132 may be configured such that the target voltage magnitude (at which the output voltage of the photovoltaic system 130 is regulated) is selected to correspond to the operating voltage of the DC bus 121. In particular, the boost voltage conversion functionality of the voltage regulator arrangement 132 may be used to convert the (relatively low) output voltage of the photovoltaic system to correspond to the (relatively high) operating voltage of the DC bus 121. In such examples, the output of the photovoltaic system 130 may be directly electrically connected to the DC bus 121. Advantageously, this arrangement provides an apparatus 100 having a low part count and reduced efficiency losses associated with voltage conversion between the photovoltaic system 130 and the DC bus 121.

It may be that the first example apparatus 100 comprises a DC-DC converter 126 electrically connected between the output of the photovoltaic system 130 and the DC bus 121 of the power converter 120, as shown (in dashed outline) in FIG. 2A. In other words, the output of the photovoltaic system 130 may be electrically coupled to the DC bus 121 of the power converter 120 via the DC-DC converter 126. If present, the DC-DC converter 126 may be disposed within a housing of the power converter 120 such that the power converter 120 comprises the DC-DC converter 126. In use, the DC-DC converter 126 converts the output voltage of the photovoltaic system 130 (as regulated at the target voltage magnitude) to a voltage for supply to the DC bus 121 at the operating voltage of the DC bus 121 (that is, a voltage having the first voltage magnitude, the first voltage magnitude being greater than the target voltage magnitude). Accordingly, the DC-DC converter 126 may be considered to be a boost DC-DC converter. The DC-DC converter 126 may comprise a variety of electrical components required to function as a boost DC-DC converter, as will be apparent to those skilled in the art.

In practice, the voltage regulator arrangement 132 may be unable to regulate the output voltage of the photovoltaic system at a target voltage magnitude which corresponds to the operating voltage of the DC bus 121. For example, a boost conversion ratio of the voltage regulator arrangement 132 may not be large enough to convert the output of the photovoltaic system to correspond to the operating voltage of the DC bus. In addition, while it has been described that the photovoltaic system 130 includes the voltage regulator arrangement 132, this disclosure also anticipates that the photovoltaic system 130 may not include a voltage regulator arrangement 132. In such embodiments, the output voltage of the photovoltaic system 130 may be determined based on the electrical characteristics of the photovoltaic system 130 (e.g. the type, number and arrangement of photovoltaic cells within the photovoltaic system 130) and the operational conditions (e.g. the angle and intensity of incident radiation) to which the photovoltaic system 130 is subjected. In both cases, the DC-DC converter 126 is able to convert the output voltage of the photovoltaic system 120 to an appropriate voltage for supply to the DC bus In particular, a conversion ratio of the DC-DC converter 126 may be adjustable, and therefore the DC-DC converter 126 is able to convert the output voltage of the photovoltaic system 130 (at the target voltage magnitude) to a voltage for supply to the DC bus 121 at the operating voltage of the DC bus 121 (at the first voltage magnitude) even as the output voltage of the photovoltaic system 130 varies in use per the operational conditions. Therefore, arrangements of the first example apparatus 100 that include the DC-DC converter 126 may allow the operating voltage of the DC bus 121 to be relatively high (e.g. 600-800 VDC) compared to the output voltage of the photovoltaic system 130 (e.g. less than 380 VDC, and in some examples less than 60 VDC). If present, the voltage regulator arrangement 132 may preferably select a target voltage of approximately equal to or less than 380 VDC, and more preferably select a target voltage equal to or less than 60 VDC such that the output voltage of the photovoltaic system 130 is equal to or less than 60 VDC. In examples in which the voltage regulator arrangement 132 is not present, the photovoltaic system 130 may be configured such that the output voltage is generally equal to or less than 380 VDC in use across a range of expected operational conditions, and preferably equal to or less than 60 VDC in use.

Consequently, arrangements that include the DC-DC converter 126 enable the first inverter 124 of the power converter 120 to more easily to provide an AC power output which meets the required voltage for the AC electrical power to be provided to the TRU 110 across a broad range of operating conditions while the output voltage of the photovoltaic system 130 may be kept relatively low. As discussed above, the output voltage of the photovoltaic system 130 being relatively low is associated with an improved safety of the apparatus 100. Therefore, this specific arrangement of the apparatus 100 may provide more versatile and safer means for supplying electrical power to the TRU 110.

In contrast to the first example apparatus 100, in the second example apparatus 101 (as shown in FIG. 2B), the output of the photovoltaic system 130 is electrically coupled to the PDU 140. As described above, any DC electrical voltages which are supplied to the PDU 140 should match the operating voltage of the PDU. Moreover, the operating voltage of the PDU 140 corresponds to a voltage of the battery 150, which is liable to variation according to the SOC of the battery. For these reasons, in the second example apparatus 101, the output voltage of the photovoltaic system 130 as regulated by the voltage regulator arrangement 132 is subject to variation in use to match the operating voltage of the PDU 140 (or, expressed in another way, to correspond to the voltage of the battery 150). In particular, a controller or a processor of the PDU 140 may communicate with the voltage regulator arrangement 132 and thereby provide information to the voltage regulator arrangement 132 relating to the operating voltage of the PDU 140, such that the voltage regulator arrangement 132 may adjust its operation to regulate the output voltage of the photovoltaic system at an appropriate target voltage magnitude so as to match the operating voltage of the PDU 140 as the operating voltage of the PDU 140 varies over time due to, for example, a change in the SOC of the battery 150. Therefore, the specific arrangement of the second example apparatus 101 allows the photovoltaic system 130 to be simply incorporated within the apparatus 100 without a need for additional components or circuitry such as the DC-DC converter 126 described above with reference to FIG. 2A.

Figure 3A:
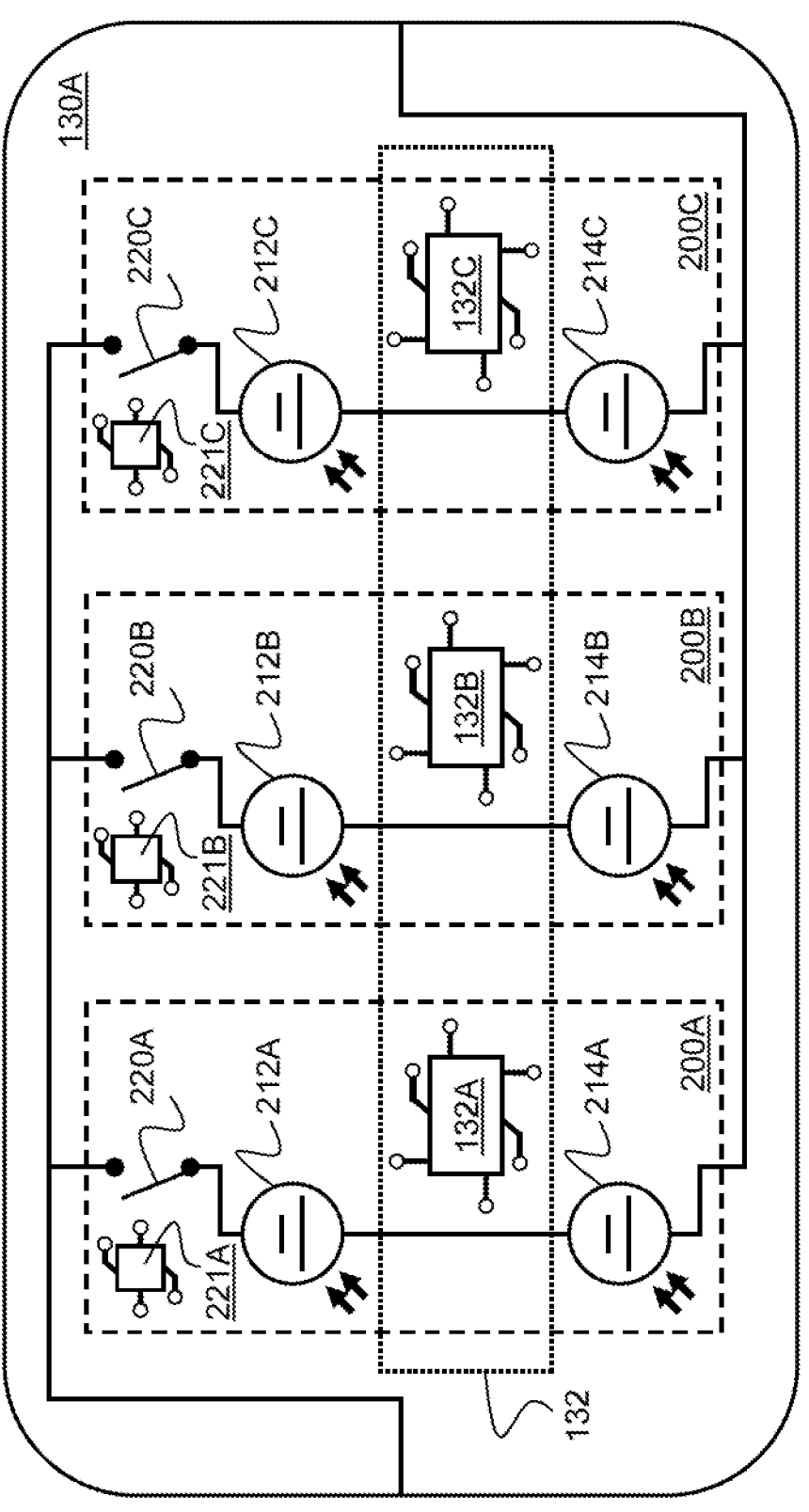
FIG. 3A shows a first example electrical topology of a photovoltaic system suitable for use as part of the first example apparatus of FIG. 2A and/or the second example apparatus of FIG. 2B.
Figure 3B:
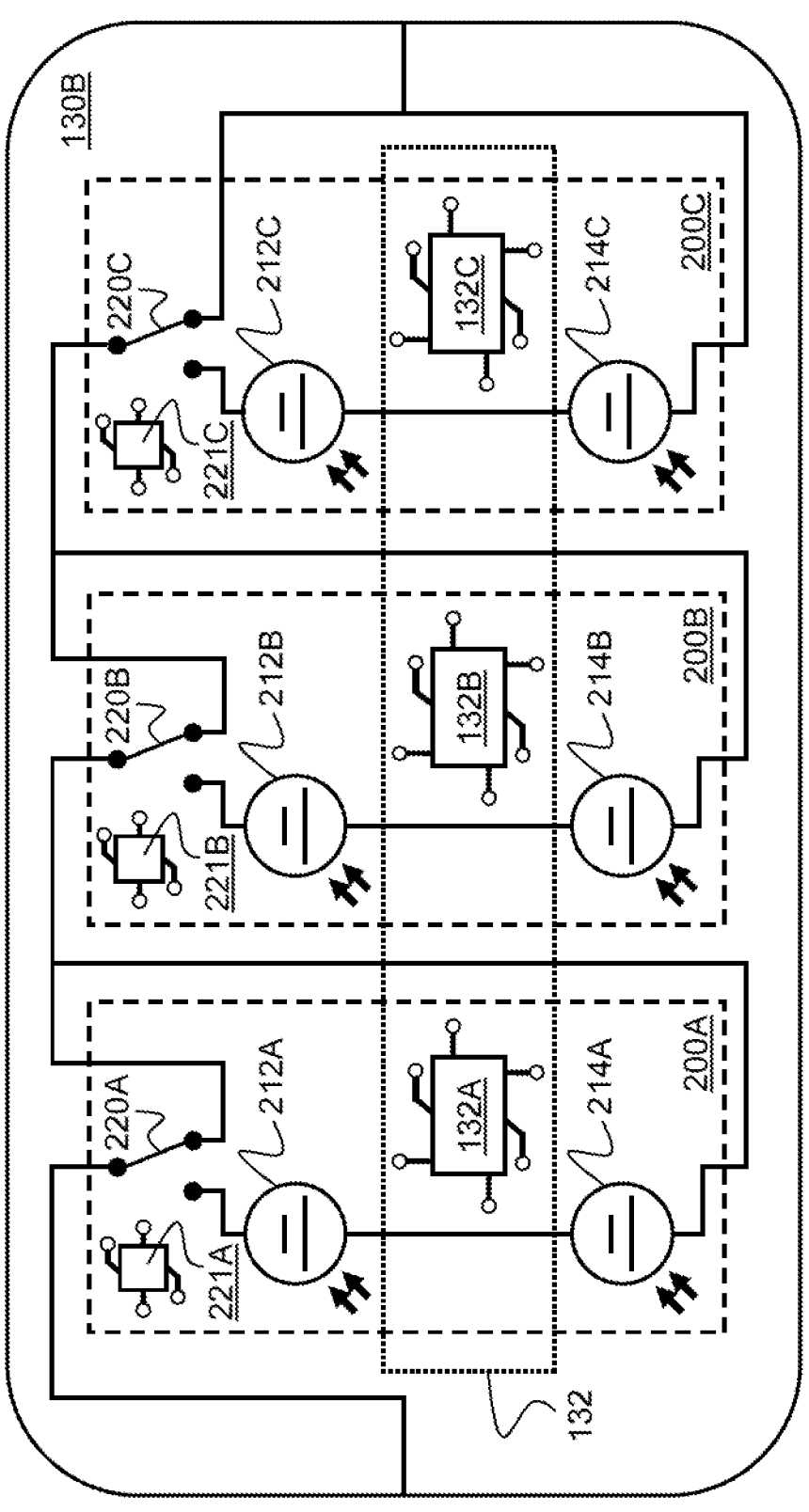
FIG. 3B shows a second example electrical topology of a photovoltaic system suitable for use as part of the first example apparatus of FIG. 2A and/or the second example apparatus of FIG. 2B.

FIGS. 3A and 3B show example electrical topologies 130A and 130B respectively of an example photovoltaic system 130 suitable for use as part of the first example apparatus 100 of FIG. 2A and/or the second example apparatus 101 of FIG. 2B. In the first example electrical topology 130A shown by FIG. 3A, the photovoltaic system 130 comprises a plurality of photovoltaic strings 200A, 200B, 200C arranged in parallel, and the voltage regulator arrangement 132 comprises a plurality of voltage regulator units 132A, 132B, 132C each provided to a respective photovoltaic string. In the illustrated examples, each photovoltaic string 200A, 200B, 200C comprises a plurality of photovoltaic cells 212A, 214A, 212B, 214B, 212C, 214C connected in series, but it will be appreciated that any of the photovoltaic strings 200A, 200B, 200C may comprise only one photovoltaic cell 212A, 212B, 212C.

Each voltage regulator unit 132A, 132B, 132C is configured to regulate an output voltage of a respective photovoltaic string 200A, 200B, 200C. Those skilled in the art will be familiar with suitable voltage regulator circuitry for each voltage regulator arrangement 132A, 132B, 132C. In particular, each voltage regulator unit 132A, 132B, 132C may be configured to individually regulate the output voltage of each photovoltaic cell within the respective photovoltaic string 200A, 200B, 200C. These arrangements may allow the output voltage of the photovoltaic system 130 to be more precisely and effectively controllable at the target voltage magnitude in use, which enables the output voltage of the photovoltaic system 130 to be more readily utilised within the apparatus 100, 101. In addition, if the output voltage of any one of the photovoltaic strings 200A, 200B, 200C drops below the output voltages of the remaining photovoltaic strings 200A, 200B, 200C, the respective voltage regulator unit 132A, 132B, 132C may compensate within a boost range thereof. This may increase a service life of the photovoltaic system 130.

Further, in the first example electrical topology 130A of FIG. 3A, each photovoltaic string 200A, 200B, 200C comprises an isolation contactor or switch 220A, 220B, 220C and is provided with an isolation controller 221A, 221B, 221C. Each isolation contactor 220A, 220B, 220C is configured to galvanically isolate the respective photovoltaic string 200A, 200B, 200C from the other photovoltaic strings 200A, 200B, 200C. Each isolation controller 221A, 221B is configured to selectively isolate the respective photovoltaic string 200A, 200B, 200C to which it is provided using the corresponding isolation contactor 220A, 220B, 220C. In particular, each isolation controller 221A, 221B, 221C may be configured to make a determination as to whether any of the photovoltaic cells 212A, 214A, 212B, 214B, 212C, 214C of the respective photovoltaic string 200A, 200B, 200C is in a fault condition based on the output voltage and/or an output current of the respective photovoltaic string 200A, 200B, 200C. For instance, if the output current of the respective photovoltaic string 200A, 200B, 200C exceeds a fault current threshold, the isolation controller 221A, 221B, 221C may determine that the photovoltaic string 200A, 200B, 200C is in the fault condition. In response to the determination that the respective photovoltaic string 200A, 200B, 200C is in the fault condition, the isolation controller 221A, 221B, 221C is configured to isolate the respective photovoltaic string 200A, 200B, 200C.

Although the isolation controllers 221A, 221B, 221C have been shown and described separately to the voltage regulation units 132A, 132B, 132C, it will be appreciated that in some examples, the photovoltaic system 130 does not comprise the plurality of isolation controllers 221A, 221B, 221C and the voltage regulation units 132A, 132B, 132C are configured to perform the function of the isolation controllers 221A, 221B, 221C described above. Otherwise, it may be that the photovoltaic system 130 does not comprise the plurality of voltage regulation units 132A, 132B, 132C but does comprise the plurality of isolation controllers 221A, 221B, 221C (such as when the photovoltaic system 130 is incorporated within the first example apparatus 100). Further, those skilled in the art will appreciate that it may be that the voltage regulation arrangement 132 only comprises a single voltage regulation unit configured to regulate a total output voltage of each of the plurality of photovoltaic strings 200A, 200B, 200C.

As a result, the photovoltaic system 130 is able to galvanically isolate a photovoltaic string 200A, 200B, 200C from the remainder of the photovoltaic system 130 and the wider apparatus 100, 101 when the photovoltaic string 200A, 200B, 200C is malfunctioning. An ability to galvanically isolate a malfunctioning photovoltaic string 200A, 200B, 200C, as provided by the photovoltaic system 130, may provide a greater degree of safety of the apparatus 100, 101. Further, because the plurality of photovoltaic strings 200A, 200B, 200C are arranged in parallel, galvanic isolation of any individual photovoltaic string 200A, 200B, 200C does not cause the entire photovoltaic system 130 to cease functioning and no longer provide electrical energy to another component of the apparatus 100, 101, which increases a resilience of the apparatus 100, 101 in use without significantly increasing a complexity of the apparatus 100, 101. These features may be especially advantageous where the apparatus 100, 101 forms part of a mobile climate-controlled module, because electrical faults within the photovoltaic system 130 may arise when the mobile climate-controlled module is in transport and therefore cannot be easily accessed for maintenance and/or may be particularly vulnerable to any adverse consequences of the development of an electrical fault due to a lack of an earth ground.

The second example electrical topology 130B of the photovoltaic system 130 shown by FIG. 3B is generally similar to the first example electrical topology shown by FIG. 3A, with like reference signs indicating common or similar features. However, in the second example electrical topology shown by FIG. 3B, the plurality of photovoltaic strings 200A, 200B, 200C are arranged in series. In the example of FIG. 3B, each isolation contactor or switch 220A, 220B, 220C is a single pole double throw switch. Therefore, each contactor or switch 220A, 220B, 220C is configured to simultaneously isolate and bypass the respective photovoltaic string 200A, 200B, 200C such that galvanic isolation of the photovoltaic string does not cause the entire photovoltaic system 130 to cease functioning and no longer provide electrical energy to another component of the apparatus 100, 101, which increases a resilience of the apparatus 100, 101 in use, at the expense of increase complexity compared to the first example electrical topology of FIG. 3A. Moreover, the series arrangement of FIG. 3B may enable the output voltage of each photovoltaic string 200A, 200B, 200C to be lower than the output voltage of each photovoltaic string 200A, 200B, 200C in the parallel arrangement of FIG. 3A for the same total output voltage of the photovoltaic system 130. This increases an electrical safety of the photovoltaic system 130 and therefore the apparatus 100, 101 in which it is incorporated.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

The invention claimed is:

1. An apparatus configured to supply electrical power to a transport refrigeration unit, the apparatus comprising:
   a power converter including:
   a rectifier;
   an inverter; and a DC bus, wherein the DC bus is internal to the power converter and is electrically connected to an output of the rectifier and an input of the inverter, wherein an input of the rectifier is electrically connectable to a power source external to the apparatus at a connection port of the apparatus and an output of the inverter is electrically couplable to the transport refrigeration unit;

a power distribution unit electrically coupled to the DC bus of the power converter; and a photovoltaic system including a photovoltaic cell and provided with a voltage regulator arrangement configured to regulate an output voltage of the photovoltaic system at a target voltage magnitude, wherein an output of the photovoltaic system is electrically coupled to the power distribution unit, wherein the power distribution unit is configured to act as an interface between the DC bus and the photovoltaic system such that power can be supplied to the transport refrigeration unit from the photovoltaic system to meet a power demand of the transport refrigeration unit in use of the transport refrigeration unit, and wherein the apparatus further comprises a DC-DC converter connected between the DC bus of the power converter and the power distribution unit, wherein the DC-DC converter is configured to:

convert a voltage supplied to the DC-DC converter by the power distribution unit from a second voltage magnitude to a first voltage magnitude for supply to the DC bus, the first voltage magnitude corresponding to an operating voltage of the DC bus and the second voltage magnitude corresponding to an operating voltage of the power distribution unit; and convert a voltage supplied to the DC-DC converter by the DC bus from the first voltage magnitude to the second voltage magnitude for supply to the power distribution unit.

2. The apparatus according to claim 1, further comprising a battery electrically connected to the power distribution unit, and wherein the target voltage magnitude is selected to correspond to a voltage of the battery.

3. The apparatus according to claim 1, wherein the output of the inverter is electrically couplable to the transport refrigeration unit via an output sine-wave filter, and/or wherein the input of the rectifier is electrically couplable to the external power source via an input filter.

4. The apparatus according to claim 1, wherein the photovoltaic system comprises a plurality of photovoltaic strings arranged in parallel, each photovoltaic string comprising at least one photovoltaic cell; and each photovoltaic string further comprises an isolation contactor configured to isolate the respective photovoltaic string.

5. The apparatus according to claim 1, wherein the photovoltaic system comprises a plurality of photovoltaic strings arranged in series, each photovoltaic string comprising at least one photovoltaic cell; and each photovoltaic string further comprises an isolation contactor configured to isolate and bypass the respective photovoltaic string.

6. The apparatus according to claim 4, wherein each of the plurality of photovoltaic strings comprises a plurality of photovoltaic cells connected in series.

7. The apparatus according to claim 1, further comprising an electrical generator, and wherein the input of the rectifier is also electrically coupled to the electrical generator, and optionally wherein the electrical generator comprises an internal combustion engine, a gas turbine engine and/or a kinetic energy recovery system.

\* \* \* \* \*